Nov. 19, 1940.  E. P. KOPPIN ET AL  2,222,036
TIRE GROOVER
Filed July 28, 1938
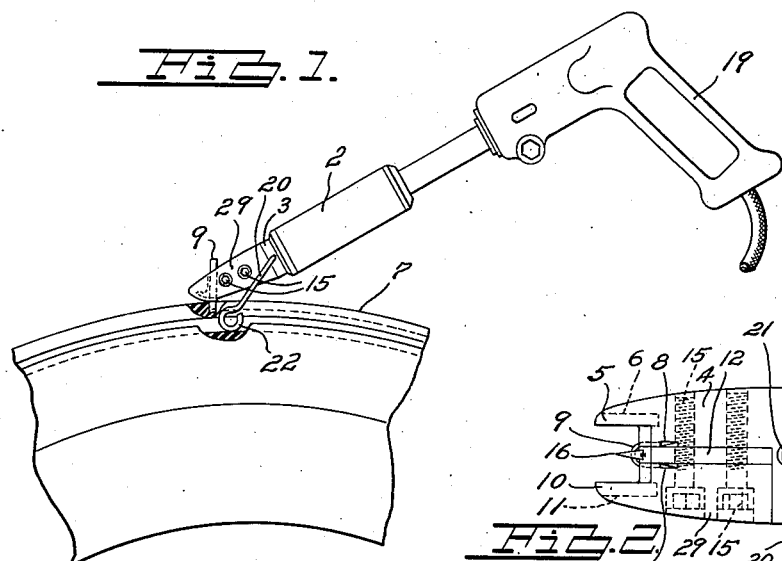
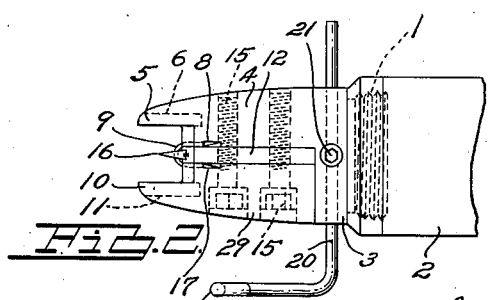
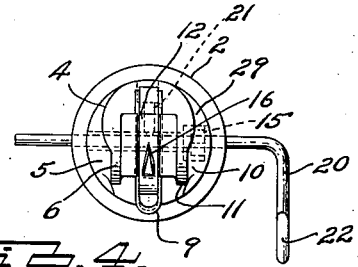
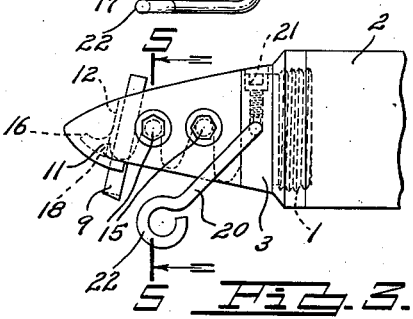
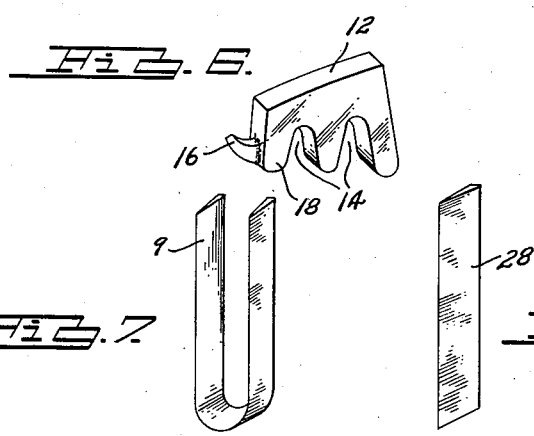
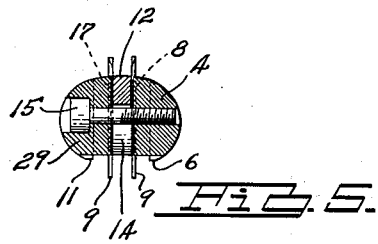
INVENTORS
Eugene P. Koppin
Edward Elmer Staub
BY
ATTORNEY.

Patented Nov. 19, 1940

2,222,036

UNITED STATES PATENT OFFICE 2,222,036

TIRE GROOVER

Eugene P. Koppin, Ypsilanti, and Edward Elmer Staub, Detroit, Mich., assignors to Allied Manufacturers, Inc., a corporation of Michigan Application July 28, 1938, Serial No. 221,778

3 Claims. (Cl. 30—140)

This invention relates to tire groovers and the object of the invention is to provide a tire groover having a head and a central member provided with a guide point acting as a sight guide for use in grooving a tire.

Another object of the invention is to provide a tire groover having a heated head and arranged so that different central members may be provided therein of different widths to take wider or narrower cutting blades and arranged to space the edges of the blades a distance apart equal to the width of the removable central member.

A further object of the invention is to provide a tire groover having a head formed of a stationary guide member and a removable guide member and a removable central member arranged to be clamped in position between the guide members.

Another object of the invention is to provide a tire groover having a stationary and a movable guide member and a center member adapted to be clamped between the guide members, the central member being provided with a sight point normally having a central position between the ends of the guide members when the central member is clamped therebetween.

A further object of the invention is to provide a tire groover having a heated head formed with spaced guide members at the outer end and a removable central member having a sight point between the spaced ends of the guide members whereby when moving the groover over a tire the guide members will ride on the tire and the sight point may be utilized in following a line or marking on the tire to groove the same to the desired pattern.

Another object of the invention is to provide a tire groover having a head in which one or a series of blades may be mounted as well as U-shaped blades for grooving or slitting the tread of a tire and the blade being heated by the heating of the head through electrical heating means.

These objects and the several novel features of the invention are hereinafter more fully described and claimed and the preferred form of construction by which these objects are attained is shown in the accompanying drawing in which—

Fig. 1 is a side elevation of a tire groover showing its use in grooving a tire tread.

Fig. 2 is an enlarged plan view of the head of the groover.

Fig. 3 is a side elevation thereof.

Fig. 4 is an end view of the groover head.

Fig. 5 is a section taken on line 5—5 of Fig. 3 and showing two single blades in place of the U-shaped blade.

Fig. 6 is a perspective view of a wider central member than that shown in Figs. 2, 4 and 5.

Fig. 7 is a perspective view of one of the U-shaped blades utilized in the head.

Fig. 8 is a perspective view of a straight blade for use in the head.

Fig. 9 is a view showing the relationship of the blade to the channels in the stationary and removable guide members.

The head is preferably formed of a metal through which heat will transfer readily and the head as shown in Figs. 2 and 3 is provided with a threaded portion 1 which may be threaded into the electrically heated member 2. This head is provided with a circular portion 3 from which the guide member 4 extends on one side. This guide member is provided with an extending lug 5 at the end and on the underside the lug 5 is provided with a curved shoe 6 formed integrally therewith and shaped to ride on the surface of the tire 7, as will be understood from Fig. 1. This guide member 4 is also provided with a channel 8 to receive one side of a U-shaped blade 9 as will be understood from Figs. 2, 3, 4 and 7. A similar guide member 29 is provided for the opposite side of the head and this guide member 29 is removable but is provided with an extending lug 10 having a curved shoe 11 formed integrally on the underside of the lug 10. This shoe also will ride on the surface of the tire when the tool is being used as shown in Fig. 1.

Clamped between the two guide members 4 and 29 is a central member 12. This member 12 may be wider or narrower as desired in accordance with the width of the blade to be used and a wider member 12 is shown in Fig. 6. Each member 12 is provided with notches 14 to fit over the clamp screws 15 of the groover head and at the end is provided with an integral extending guide point 16. This guide point is at the exact center of the member 12 so that when clamped between the guide members 4 and 29 this center point 16 will be centrally between the lugs 5 and 10 of the head. Members 12 of different width may be used with this device and as the sight point 16 is provided in exact center of each member, it will come in the center between the lugs 5 and 10 so that it is very easy for the user to sight over this point in grooving a tire.

The U-shaped blade 9 is fitted into the channels 8 and 17 provided in the guide members 4 and 29 and these channels run along opposite sides of the lug 18 on the central member 12 which holds the ends of the blade 9 in the channels and the clamping action of the screws 15 firmly secures the ends of the blade in position. It will be noted more particularly from Fig. 3 that the blade extends at a slight angle to the head so that when the head is raised to the cutting position shown in Fig. 1 the guide shoes 6 and 11 will ride on the tire with the blade 9 at or near the vertical position. This blade may be adjusted up or down in the head, by loosening the guide screws, to give a cut of greater or less depth and blades 9 of different widths may be used in combination with center members 12 of different widths so as to give a wider or narrower cut in accordance with the width of the blade. In some of the later tires, very fine slits are provided in the tire surface either running longitudinally of the tire or longitudinally and transversely thereof.

These slits may be readily cut by using two single blades in the grooving head as will be understood from Fig. 5 and, in fact, a single blade 28 shown in Fig. 8 may be used in the head by taking out the central member 12 and inserting the blade in the channel 8 or 17 but, in this case, a shim must be used to hold the blade in position in its channel. To remove or replace the blade and central member, it is only necessary to loosen the screws 15, at which time, the central member may be lifted off from the screws and a central member of different width replaced therein. Also, while the center member 12 is removed, the blades may be replaced in the channels 8 and 17.

In regrooving a tire tread, the operator either tries to follow the marks of the earlier grooving before the tire was worn or, in the case of a revulcanized tread with a perfectly smooth surface, the tread is generally marked to provide a pattern to which the tread is to be grooved. In either case, the operator holds the handle 19 and sights over the sight point 16 on the central member 12 to follow the desired pattern and the lugs 5 and 10 allow the operator with his eye to follow the pattern and keep the point 16 over the marking.

In some cases, it is desired to space the grooves a fixed distance apart. For this purpose, a guide rod 20 may be provided extending through a bore in the head portion 3 and a set screw 21 is provided for securing the guide rod 20 in position. This guide rod 20 is provided with a rounded end 22 which may ride in an adjacent groove as shown in Fig. 1 or against the side of the tire and will space the next groove being cut the desired distance from the groove in which the guide is riding or from the side of the tire.

It is also possible to provide two or more central members 12 mounted between the side members with each central member provided with a guide point. In this case, the blades are clamped between the several central members and the side members and this arrangement will allow a multiplicity of blades to be used for cutting a series of grooves or slots at the same time. In this construction, the guide points would be used in guiding the several blades though it would not be absolutely necessary to provide all of the central members with guide points. This arrangement would be the same as that shown in the figures in the drawing in that the side members would extend beyond the blades and the central members would be positioned between the side members with one or more of the central members provided with guide points so that the eye may be used in guiding the groover.

The member 12 has been described as provided with a guide point 16. However, any suitable guide indication may be utilized on the member 12 whether it is a guide point, a sight notch, a raised sight or any type of guide indication which may be utilized in visibly guiding the groover during the grooving operation.

While the device has been described as arranged for hand operation, it is also possible to utilize the grooving head in a machine for tire grooving in which case the grooving head would be mounted in an integral part of the machine and could be heated or not as desired.

Fig. 9 is a plan view of the removable and stationary guide members separated and showing the blade in its relationship to the channels 8 and 17 in the stationary and removable guide members. In order to prevent confusion, the central member is not shown in this view but this central member is shown in Fig. 6 and is inserted between the sides of the blade 9 when assembled as shown in Fig. 2 and as will be understood from Figs. 6 and 7. These channels 8 and 17 act to hold the blade in position and when the screws 15 shown in Figs. 2 and 3 are turned up, the blade is bindingly engaged in the channels 8 and 17 against the flat sides of the central member 12.

From the foregoing description it becomes evident that the device is very simple and efficient in operation, will not easily get out of order, is composed of few parts and is of consequent low manufacturing cost and provides a device which accomplishes the objects described.

Having thus fully described our invention, its utility and mode of operation, what we claim and desire to secure by Letters Patent of the United States is:

1. In a tire groover, a grooving head, a center member arranged to be secured in the grooving head, a blade secured in the grooving head against the center member and a guide point formed in the end of the center member beyond the blade providing a sight for guiding the blade.

2. In a tire groover, a grooving head having an integral stationary guide member forming an extension at one side of the grooving head, a replaceable central member and a removable guide member completing the grooving head, the removable guide member being of the same shape as the stationary guide member and when secured in position forming an extension of the opposite side of the grooving head from the stationary guide member, a pair of screws extending through the removable guide member and central member and threaded into the stationary guide member, each guide member being provided with a channel in the face toward the central member, a cutting blade seating in the said channels on opposite sides of the central member and clamped in position therein by said screws, a terminal lug on each guide member providing a sight opening therebetween and a guide point on the central member forward of said blade and providing a sight for use in guiding the grooving head and blade over the surface of a tire.

3. In a tire groover, a grooving head comprising a stationary guide member, a central member and a removable guide member, the stationary guide member being recessed to receive the central member and removable guide member, a pair of screws extending through the removable guide member and central member and threaded into the stationary guide member to secure the parts together, each guide member being provided with a channel in the face toward the central member, a blade having ends seating in the said channels and clamped in position therein by said screws, a terminal lug on each guide member spaced from the central member and providing a sight opening therebetween and a guide point on the central member providing a sight for use in guiding the grooving head and blade over the surface of a tire.

EUGENE P. KOPPIN.
EDWARD ELMER STAUB.